(12) United States Patent
Hirai (10) Patent No.: US 8,064,157 B2
(45) Date of Patent: Nov. 22, 2011

(54) BURST PATTERNS FOR MAGNETIC DISKS AND MAGNETIC DISK DEVICES

(75) Inventor: Yukio Hirai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/543,164

(22) Filed: Aug. 18, 2009

(65) Prior Publication Data

US 2010/0073811 A1    Mar. 25, 2010

(30) Foreign Application Priority Data

Sep. 22, 2008  (JP) ................. 2008-242479

(51) Int. Cl.
*G11B 5/596*   (2006.01)
(52) U.S. Cl. .................. 360/77.08; 360/48; 360/135
(58) Field of Classification Search .................. None
See application file for complete search history.

(56) References Cited

U.S. PATENT DOCUMENTS

| | | | | |
|---|---|---|---|---|
| 7,403,353 B2 * | 7/2008 | Tagami et al. | ............. | 360/77.08 |
| 2006/0061900 A1 | 3/2006 | Ohtsuka et al. | | |
| 2007/0217075 A1 * | 9/2007 | Kamata et al. | ................ | 360/135 |
| 2007/0281078 A1 | 12/2007 | Kikitsu et al. | | |

FOREIGN PATENT DOCUMENTS

| | | |
|---|---|---|
| JP | A 2006-73137 | 3/2006 |
| JP | A 2007-272962 | 10/2007 |
| JP | A 2007-323724 | 12/2007 |

* cited by examiner

*Primary Examiner* — Jason Olson
(74) *Attorney, Agent, or Firm* — Greer, Burns & Crain, Ltd.

(57) ABSTRACT

A magnetic disk includes: a data recording region having first magnetic parts; the first magnetic parts being arranged in a circumferential direction in the nonmagnetic region and form tracks, and the tracks being arranged in a radial direction at a track pitch Tp; and a burst pattern region having burst patterns making a magnetic head follow the first magnetic parts, the burst patterns having second magnetic parts, the second magnetic parts forming base units arranged at a pitch Sp in a radial direction of the disk, the pitch Sp being more than twice as large as the track pitch Tp, the base units including a plurality of base units arranged in a circumferential direction of the disk, and the base units adjacent to each other in the circumferential direction being displaced from each other by the pitch Sp in the radial direction of the disk.

6 Claims, 7 Drawing Sheets

BURST PATTERNS FOR MAGNETIC DISKS AND MAGNETIC DISK DEVICES

CROSS-REFERENCE TO RELATED APPLICATIONS

This application is based upon and claims the benefit of priority of the prior Japanese Patent Application No. 2008-242479, filed on Sep. 22, 2008, the entire contents of which are incorporated herein by reference.

FIELD

An embodiment of the present invention relates to a magnetic disk referred to as a so-called patterned medium and to a magnetic disk device provided with such a magnetic disk.

BACKGROUND

Conventional magnetic disks referred to as patterned media include a magnetic disk disclosed in FIG. 3 of JP-A-2007-323724. This magnetic disk has a data section in which a plurality of magnetic parts are formed in a nonmagnetic region so as to form a plurality of tracks along the circumferential direction of the disk at a predetermined track pitch in the radial direction of the disk and a servo section as a region for making a magnetic head follow each track of the data section. In the servo section, burst patterns, each being made up of a plurality of magnetic parts arranged in the radial direction of the disk at a pitch distance which is twice the track pitch, form a plurality of lines in the circumferential direction of the disk, and, in the adjacent burst pattern lines, the magnetic parts are formed so as to be displaced from each other in the radial direction of the disk by ½ or ¼ of the pitch distance.

In a magnetic disk device provided with such a magnetic disk, each magnetic part of the data section is provided with a magnetization direction perpendicular to the disk surface by a recording element of the magnetic head, whereby magnetic information is recorded. When such recording is performed, control of the position of the magnetic head relative to a recording target track, that is, tracking control is performed. This tracking control uses an address signal obtained by reading address information of the track and a burst signal obtained by reading a plurality of burst patterns in the servo section, and, based on these signals, generates a linear position signal in the radial direction of the disk. As a result, the magnetic head is made to follow a recording target track based on the position signal in the radial direction of the disk.

SUMMARY

According to an aspect of the invention, a magnetic disk includes: a data recording region having first magnetic parts; the first magnetic parts being arranged in a circumferential direction in the nonmagnetic region and form tracks, and the tracks being arranged in a radial direction at a track pitch Tp; and a burst pattern region having burst patterns making a magnetic head follow the first magnetic parts, the burst patterns having second magnetic parts, the second magnetic parts forming base units arranged at a pitch Sp in a radial direction of the disk, the pitch Sp being more than twice as large as the track pitch Tp and less than four times as large as the track pitch Tp, the base units including a plurality of base units arranged in a circumferential direction of the disk, and the base units adjacent to each other in the circumferential direction being displaced from each other by ½ or ¼ of the pitch Sp in the radial direction of the disk.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In a magnetic disk, it is preferable that a magnetic read width (read core width) of a reproducing element of a magnetic head be relatively equal to a track pitch. When the magnetic read width is relatively equal to the track pitch, even when the magnetic head deviates somewhat in the radial direction of the disk, a plurality of burst patterns may be read. On the other hand, when the magnetic read width is too large or too small relative to the track pitch, if the magnetic head deviates slightly in the radial direction of the disk, a so-called dead band where no change occurs in a burst signal which is supposed to be read appears. This may result in an increasing number of tracking errors because only position signals which are noncontiguous in the radial direction of the disk may be obtained, making it impossible to perform reading/writing of magnetic information normally on the magnetic disk.

An embodiment of the present invention provides a magnetic disk and a magnetic disk device that eliminate a dead band at the time of tracking control and perform reading/writing of the magnetic information along a track normally.

A magnetic disk in accordance with an embodiment of the invention has a data recording region and a burst pattern region. The data recording region has a plurality of first magnetic parts in a nonmagnetic region, the plurality of first magnetic parts formed in such a way that a plurality of tracks are arranged at a track pitch in the radial direction of the disk, the track pitch according to the read core width of a magnetic head. The burst pattern region is a region for making the magnetic head follow each track of the data recording region. In the burst pattern region, a plurality of burst patterns arranged in the radial direction of the disk at a pitch Sp form a plurality of lines in the circumferential direction of the disk. The burst pattern has a plurality of second magnetic parts in a nonmagnetic region, the plurality of second magnetic parts formed in such a way that, in the adjacent burst pattern lines, the second magnetic parts are displaced from each other in the radial direction of the disk by ½ or ¼ of the pitch Sp. In the magnetic disk in accordance with an embodiment of the invention, when a track pitch in the data recording region is Tp and a pitch in the burst pattern region is Sp, Tp<Sp/2<2Tp holds.

A magnetic disk device in accordance with an embodiment of the invention is provided with a magnetic disk in which a track pitch Tp and a pitch Sp are set.

In the data recording region in accordance with an embodiment of the invention, each track is formed of a plurality of first magnetic parts arranged at a track pitch Tp which is equal to the read core width of the magnetic head, for example. In the burst pattern region, a burst pattern is formed of a plurality of base units arranged in the radial direction of the disk at a pitch Sp in the radial direction of the disk, the pitch Sp which is two to four times the track pitch Tp. A plurality of second magnetic parts are formed in such a way that the burst patterns form a plurality of lines in the circumferential direction of the disk. In the adjacent burst pattern lines, the base units are displaced from each other in the radial direction of the disk by ½ or ¼ of the pitch Sp. At the time of tracking control, when the magnetic head deviates in the radial direction of the disk, a change easily occurs in a burst signal obtained by reading a plurality of burst patterns, and a so-called dead band ceases to appear. This helps minimize tracking errors caused by a dead band at the time of tracking control, and perform reading/writing of the magnetic information along the track normally.

Figure 1:
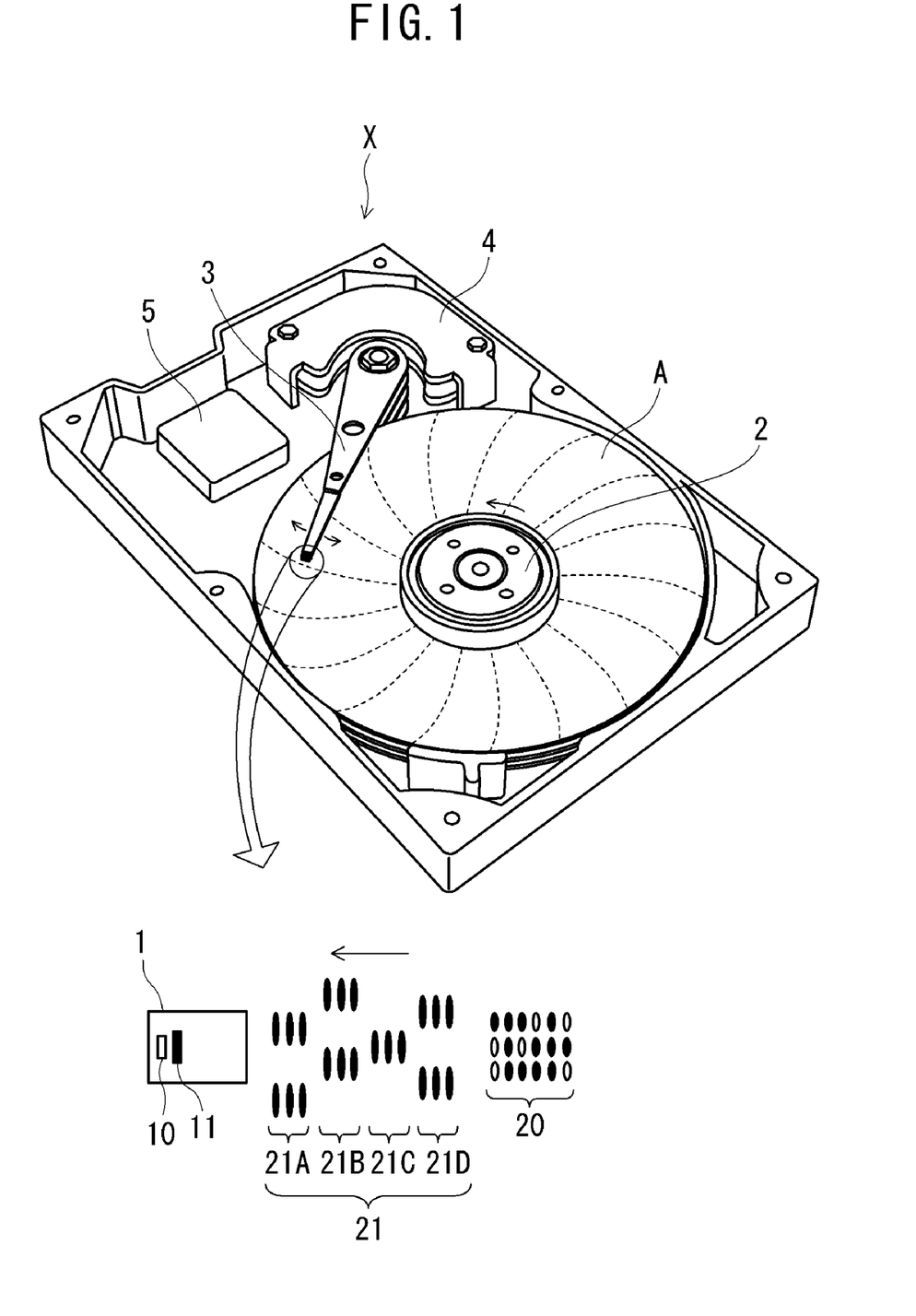
FIG. 1 is an overall perspective view illustrating an embodiment of a magnetic disk.
Figure 2:
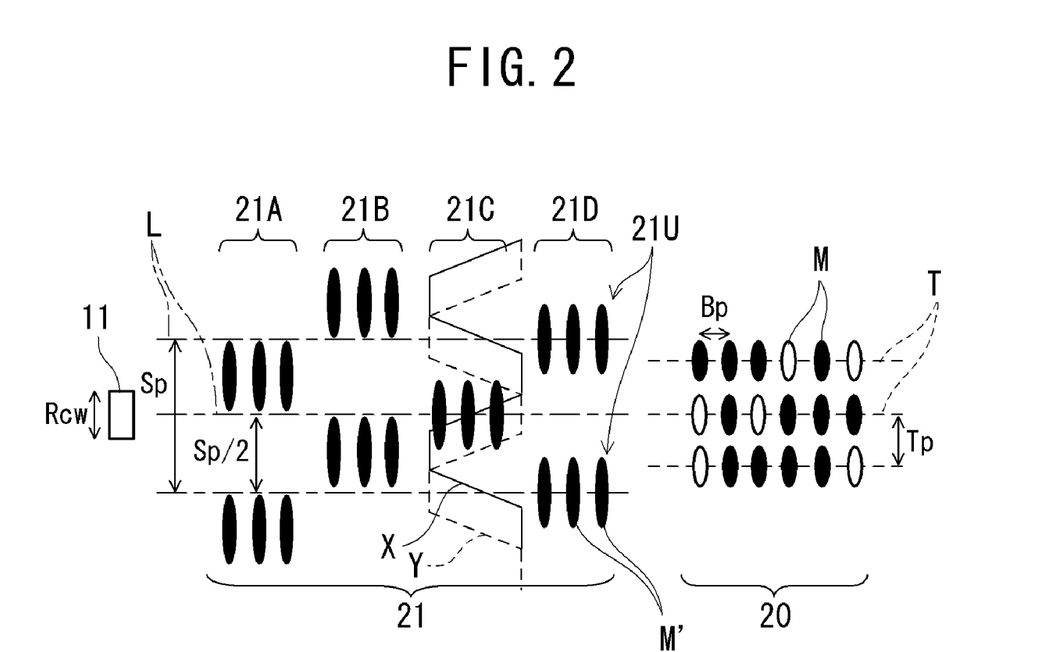
FIG. 2 is a plan view illustrating a principal portion of the magnetic disk illustrated in FIG. 1.

FIGS. 1 and 2 illustrate a magnetic disk in accordance with an embodiment of the invention. A magnetic disk A is applied to a perpendicular magnetic recording method, and is incorporated into a magnetic disk device X. The magnetic disk device X includes, in addition to the magnetic disk A, a magnetic head 1, a spindle motor 2, a swing arm 3, a voice coil motor 4, and a disk controller 5.

The magnetic head 1 magnetically reads/writes information from/on the magnetic disk A, and is supported at the tip of the swing arm 3 via unillustrated suspension and slider. The magnetic head 1 has a recording element 10 for performing recording by applying a magnetic field and a reproducing element 11 for reproducing information by reading the magnetization direction.

The spindle motor 2 rotates the magnetic disk A at high speed.

The swing arm 3 makes the magnetic head 1 reciprocate in the almost radial direction of the magnetic disk A, and is driven by the voice coil motor 4.

The voice coil motor 4 swings the swing arm 3 in response to an instruction from the disk controller 5.

The disk controller 5 controls the driving of the magnetic head 1, the spindle motor 2, and the voice coil motor 4. The disk controller 5 is a microcomputer provided with a CPU, a memory, etc., or a wired-logic circuit.

As illustrated in FIG. 2, on the recording surface of the magnetic disk A, a data recording region 20 and a burst pattern region 21 are formed in a nonmagnetic region (whose reference sign is omitted). The data recording region 20 is a partial region in which reading/writing of the magnetic information is performed. The burst pattern region 21 is a pattern for making the magnetic head 1 follow each track T of the data recording region 20. In addition to those described above, on the recording surface, a preamble pattern for generating a clock signal at the time of reading/writing of the magnetic information and an address pattern indicating address information etc. of the track are formed.

The data recording region 20 has a plurality of tracks T arranged along the circumferential direction of the disk. Each track T has a plurality of first magnetic parts M arranged in the circumferential direction of the disk at a pitch Bp. These tracks T are arranged in the radial direction of the disk at a track pitch Tp. It is preferable that the track pitch Tp be made wider than the read core width to make appropriate reading/writing of the magnetic information possible. It is preferable that the track pitch Tp be as narrow as possible from the viewpoint of making the recording density as high as possible. To satisfy these opposite requirements, the track pitch Tp is made roughly equal to a read core width (magnetic read width) Rcw of the reproducing element 11 in the recording head 1. The first magnetic part M has an elliptical shape with a major axis corresponding to the radial direction of the disk. When reading/writing of the magnetic information is performed on the first magnetic parts M of each track T, the magnetic head 1 is positioned, by tracking control, with respect to the track T to which reading/writing is performed, and magnetism continuously acts on the first magnetic parts M of the track T. The first magnetic part M to which recording has been performed has, as illustrated in the drawing as an outline ellipse or a black ellipse, a magnetization direction according to the magnetic information.

The burst pattern region 21 is a region used for tracking control. In the burst pattern region 21, burst patterns 21A to 21D formed of a plurality of base units 21U arranged in the radial direction of the disk at a pitch Sp form a plurality of lines in the circumferential direction of the disk. In the adjacent lines in the burst patterns 21A to 21D, the base units 21U are displaced from each other in the radial direction of the disk by ½ or ¼ of the pitch Sp. For example, in the burst patterns denoted by signs 21A and 21B or signs 21C and 21D, the base units 21U are displaced from each other in the radial direction of the disk by Sp/2. On the other hand, in the burst patterns denoted by signs 21B and 21C, the base units 21U are displaced from each other in the radial direction of the disk by Sp/4.

The burst patterns 21A to 21D each have the base units 21U. In each base unit 21U, second magnetic parts M' are arranged in the circumferential direction of the disk at regular pitches. The size of the base unit 21U in the radial direction of the disk is roughly equal to or greater than the track pitch Tp. These base units 21U have the second magnetic part M'. The second magnetic part M' has an elliptical shape with a major axis corresponding to the radial direction of the disk, the major axis being somewhat longer than the first magnetic part M of the data recording region 20. These second magnetic parts M' are provided with a magnetization direction in advance so as to face in the same direction. Incidentally, for the sake of convenience, the base units 21U of the burst patterns 21A to 21D are depicted as having three second magnetic parts M' arranged in the circumferential direction of the disk. The base unit 21U may have more second magnetic parts arranged in the circumferential direction of the disk. The base unit 21U may be one second magnetic part having a sufficient area.

The pitch Sp is set to a size meeting the condition Tp<Sp/2<2Tp due to the relationship with the track pitch Tp. That is, reference lines L of the burst patterns 21A to 21D are formed every Sp/2 which is one-half of the pitch Sp, and these reference lines L include the reference line L which coincides with the track T and the reference line L which does not coincide with the track T. In other words, of the plurality of burst patterns 21A to 21D, one base unit 21U included in at least any one of the burst patterns is placed in the same position as any one of the tracks T of the data recording region 20 in the radial direction of the disk. In this embodiment, as an example, the base unit 21U included in the burst pattern denoted by sign 21C is made to coincide with the track T in the second line. The information indicating such a relative positional relationship between the burst pattern 21C and the track T is included in the address information of the track.

As described above, in this embodiment, by setting the reference lines L to meet the condition $Tp<Sp/2<2Tp$, the size of the base unit 21U of the burst patterns 21A to 21D in the radial direction of the disk is made somewhat larger than the track pitch Tp. When tracking control is performed, the plurality of burst patterns 21A to 21D are read by the reproducing element 11 having the read core width Rcw which is equal to the track pitch Tp. In this embodiment, for example, a burst signal X of $(A-B)/(A+B)$ and a burst signal Y of $(C-D)/(C+D)$ whose signal amplitudes are illustrated in FIG. 2 are generated. The burst signals X and Y have a part where the amplitude becomes constant even when the position of the reproducing element 11 is shifted and a part where the amplitude changes with the shift of the position of the reproducing element 11. The parts of the burst signals X and Y where the amplitude becomes constant do not overlap each other. As the reproducing element 11 moves in the radial direction of the disk, the amplitude of at least any one of the burst signals X and Y changes. A clear change occurs in any one of the burst signals X and Y irrespective of the position of the reproducing element 11, and a so-called dead band ceases to appear. This dead band does not appear under the condition $Sp/2<Rcw<Sp$ due to the relationship between the read core width Rcw and the pitch Sp. That is, with the burst patterns 21A to 21D of this embodiment, contiguous position information in the radial direction of the disk may be obtained from the burst signals X and Y. Based on the burst signals X and Y obtained in this way and the address information, the disk controller 5 accurately recognizes the position of the magnetic head 1 in the radial direction of the disk.

The disk controller 5 incorporates an arithmetic circuit determining the position of the magnetic head 1 in the radial direction of the disk based on the address information and the burst signals X and Y. The disk controller 5 recognizes the position of the magnetic head 1 in the radial direction of the disk based on the burst signals X and Y and the address information, and thereby accurately positions the magnetic head 1 with respect to each track T.

According to the magnetic disk A of this embodiment, the track pitch Tp is equal to the read core width Rcw, and the plurality of burst patterns 21A to 21D are formed with reference to the reference lines L with the pitch Sp satisfying $Tp<Sp/2<2Tp$. When these burst patterns 21A to 21D are read, in response to fine adjustments made to the position of the magnetic head 1 in the radial direction of the disk, a clear change occurs in the burst signals X and Y. The magnetic disk A of this embodiment has virtually no so-called dead band. This makes it possible to minimize tracking errors caused by a dead band at the time of tracking control, and thereby perform reading/writing of the magnetic information normally with the magnetic head 1 accurately positioned with respect to each track T.

FIGS. 3 to 7 illustrate other embodiments of the magnetic disk in accordance with an embodiment of the invention. It is to be noted that such components as find their identical or analogous counterparts in the embodiment described above are identified with the same reference signs and numerals, and description thereof will be omitted.

Figure 3:
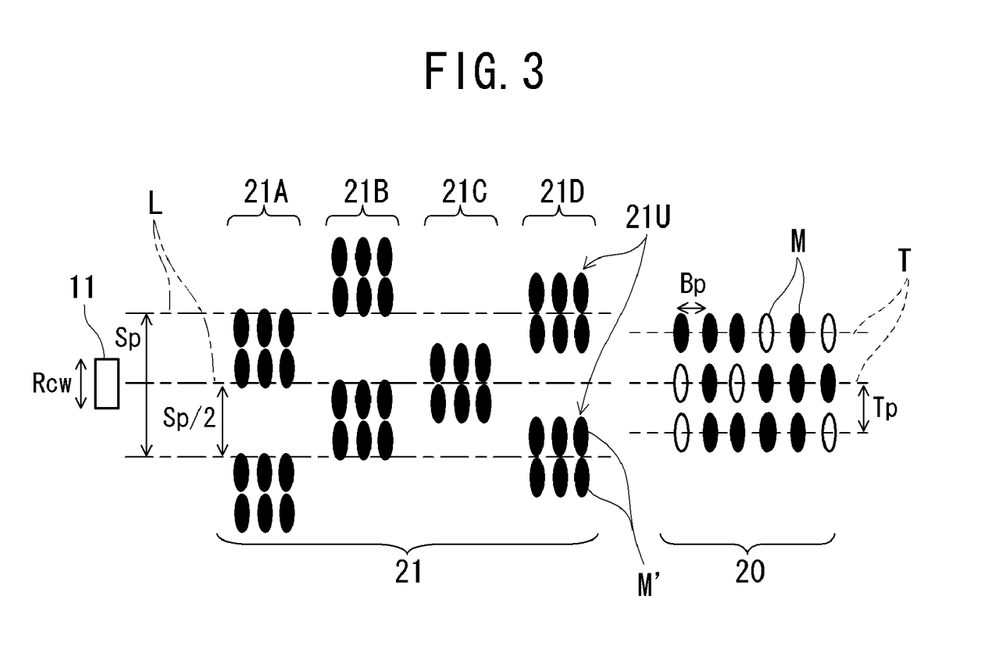
FIG. 3 is a plan view illustrating a principal portion of another embodiment of the magnetic disk.

In a magnetic disk illustrated in FIG. 3, the burst patterns 21A to 21D have base units 21U. Each base unit 21U is made up of two lines arranged in the radial direction of the disk, the two lines each being a line in which a plurality of second magnetic parts M' are arranged in the circumferential direction of the disk at regular pitches. The base units 21U have the second magnetic part M'. The second magnetic part M' has an elliptical shape which is almost the same shape as the first magnetic part M of the data recording region 20. Incidentally, for the sake of convenience, these base units 21U are each depicted as being made up of two lines arranged in the radial direction of the disk, the two lines each being a line in which three second magnetic parts M' are arranged in the circumferential direction of the disk. The base unit 21U may have four or more second magnetic parts arranged in the circumferential direction of the disk. The base unit 21U may be made up of three or more lines arranged in the radial direction of the disk. The conditions that the track pitch Tp is roughly equal to the read core width Rcw and $Tp<Sp/2<2Tp$ are the same as those of the embodiment described above.

According to the magnetic disk of FIG. 3, as is the case with the embodiment described above, tracking errors caused by a dead band are minimized. Furthermore, since the second magnetic part M' of the burst pattern region 21 and the first magnetic part M of the data recording region 20 have the same shape, it is easy to produce patterns of the data recording region 20 and the burst pattern region 21 in a nonmagnetic region at the time of production.

Figure 4:
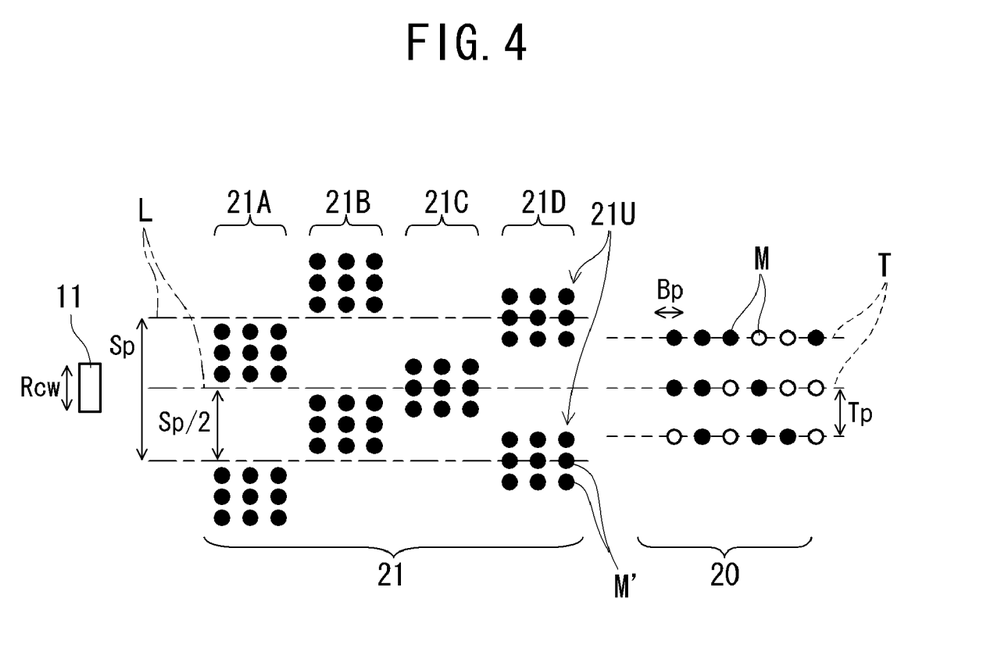
FIG. 4 is a plan view illustrating a principal portion of another embodiment of the magnetic disk.

In a magnetic disk illustrated in FIG. 4, first magnetic parts M of the data recording region 20 have a circular shape, and these first magnetic parts M are arranged in the circumferential direction of the disk, whereby a plurality of tracks T are formed. The burst patterns 21A to 21D have base units 21U. Each base unit 21U is made up of three lines arranged in the radial direction of the disk, the three lines each being a line in which a plurality of second magnetic parts M' are arranged in the circumferential direction of the disk at regular pitches. These second magnetic parts M' have a circular shape which is almost the same shape as that of the first magnetic parts M of the data recording region 20. The conditions that the track pitch Tp is roughly equal to the read core width Rcw and $Tp<Sp/2<2Tp$ are the same as those of the embodiment described above.

According to the magnetic disk of FIG. 4, as is the case with the embodiment described above, tracking errors caused by a dead band are minimized, and it is easy to produce patterns of the data recording region 20 and the burst pattern region 21 at the time of production.

Figure 5:
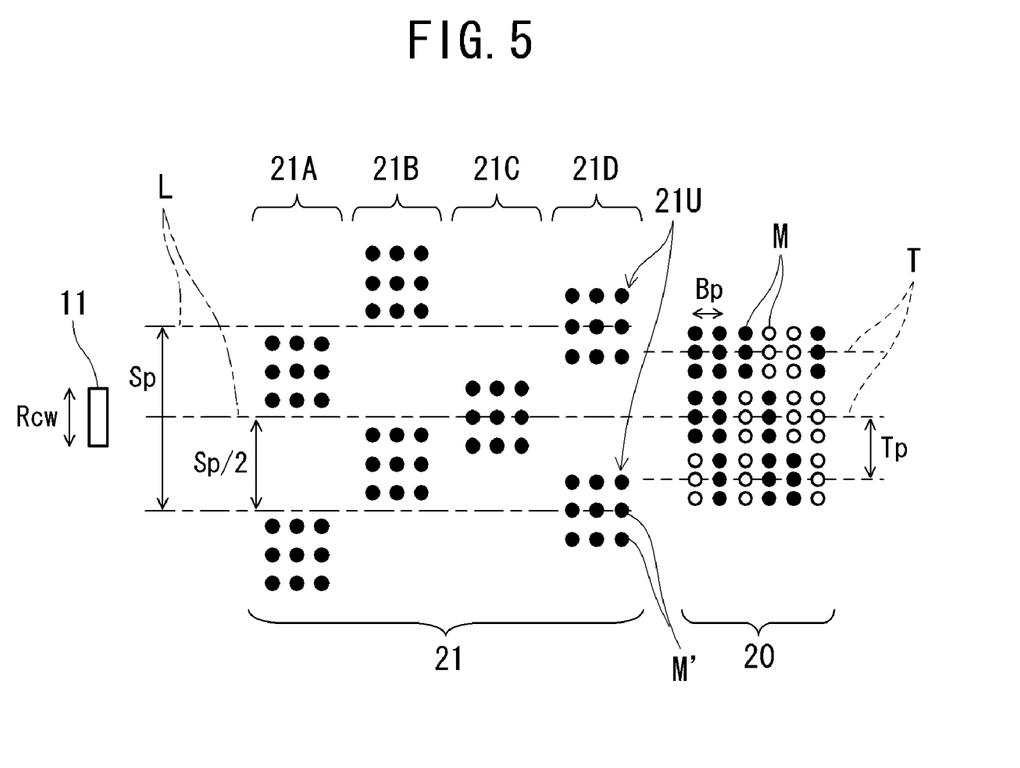
FIG. 5 is a plan view illustrating a principal portion of another embodiment of the magnetic disk.

In a magnetic disk illustrated in FIG. 5, first magnetic parts M of the data recording region 20 have a circular shape, and lines of the first magnetic parts M, the lines each being made up of three lines of the first magnetic parts M, are arranged in the radial direction of the disk, whereby a plurality of tracks T are formed. The burst patterns 21A to 21D have base units 21U. Each base unit 21U is made up of three lines arranged in the radial direction of the disk, the three lines each being a line in which a plurality of second magnetic parts M' are arranged in the circumferential direction of the disk at regular pitches. These second magnetic parts M' have a circular shape which is almost the same shape as the first magnetic parts M of the data recording region 20. The conditions that the track pitch Tp is roughly equal to the read core width Rcw and $Tp<Sp/2<2Tp$ are the same as those of the embodiment described above.

According to the magnetic disk of FIG. 5, as is the case with the embodiment described above, tracking errors caused by a dead band are minimized, and it is easy to produce patterns of the data recording region 20 and the burst pattern region 21 at the time of production. In addition to that, since the track width is virtually increased as a result of each track T being made up of three lines of a plurality of first magnetic parts M, magnetic information read/write errors are further reduced.

Figure 6:
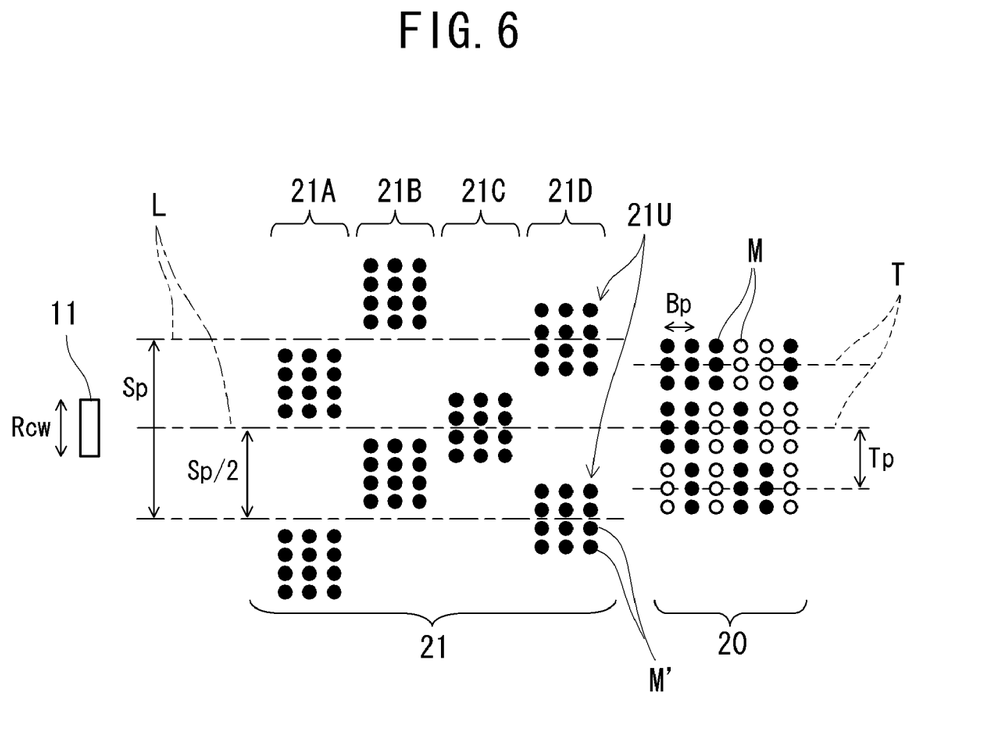
FIG. 6 is a plan view illustrating a principal portion of another embodiment of the magnetic disk.

In a magnetic disk illustrated in FIG. 6, first magnetic parts M of the data recording region 20 have a circular shape, and lines of the first magnetic parts M, the lines each being made up of three lines of the first magnetic parts M, are arranged in the radial direction of the disk, whereby a plurality of tracks T are formed. The burst patterns 21A to 21D have base units 21U. Each base unit 21U is made up of four lines arranged in the radial direction of the disk, the four lines each being a line in which a plurality of second magnetic parts M' are arranged in the circumferential direction of the disk at regular pitches. These second magnetic parts M' have a circular shape which is almost the same shape as the first magnetic parts M of the data recording region 20. The conditions that the track pitch Tp is roughly equal to the read core width Rcw and Tp<Sp/2<2Tp are the same as those of the embodiment described above.

According to the magnetic disk of FIG. 6, as is the case with the embodiment described above, tracking errors caused by a dead band are minimized. The magnetic disk of FIG. 6 makes it easy to produce patterns of the data recording region 20 and the burst pattern region 21 at the time of production. The magnetic disk of FIG. 6 helps further reduce magnetic information read/write errors.

Figure 7:
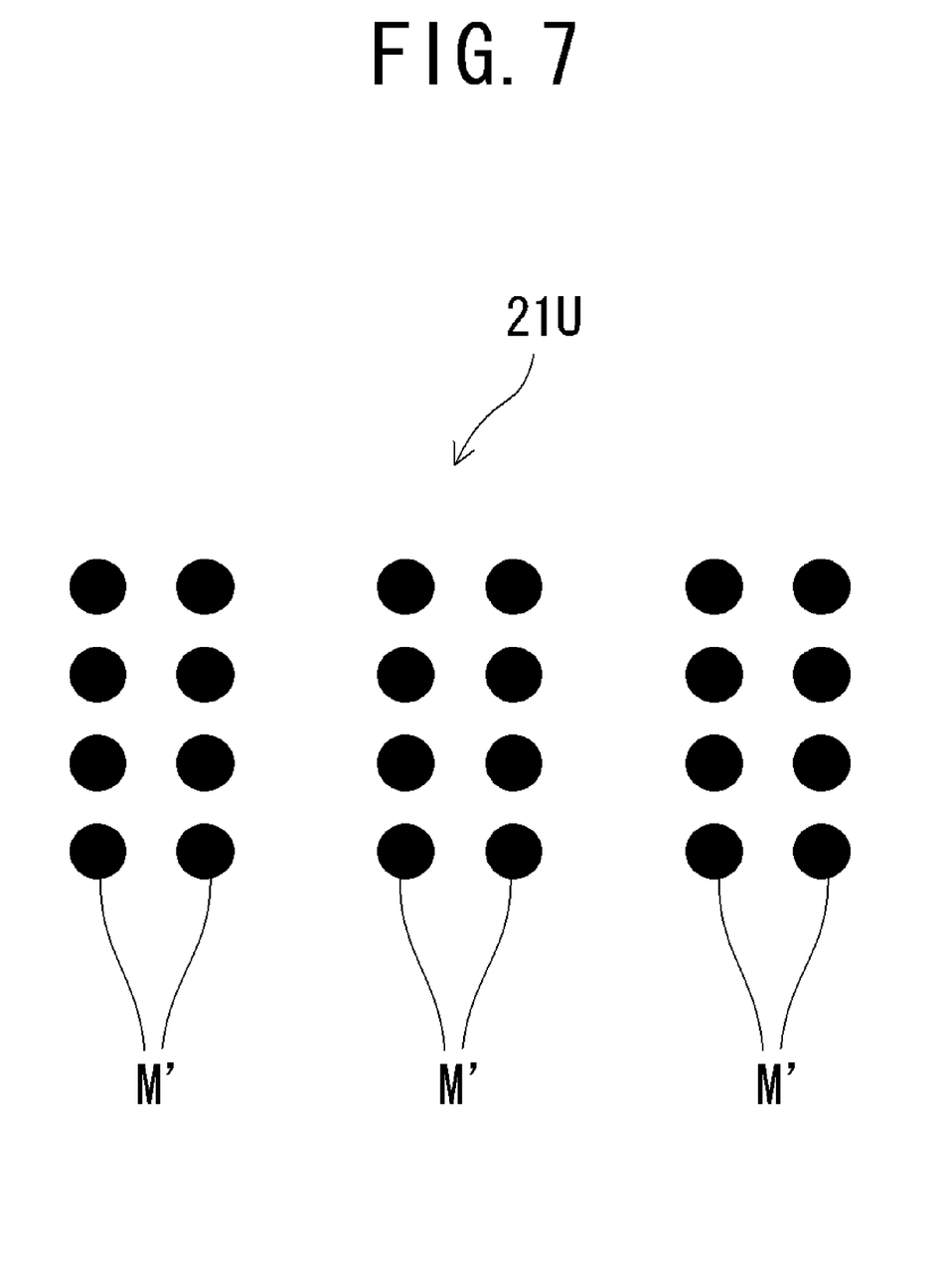
FIG. 7 is a plan view illustrating details of another embodiment of the magnetic disk.

In a magnetic disk illustrated in FIG. 7, a base unit 21U includes groups of second magnetic parts M', the groups each being made up of two lines of the second magnetic parts M' arranged in the circumferential direction of the disk, and these groups are formed in the circumferential direction of the disk at a pitch Sp. Even such a base unit 21U accurately reads a burst pattern, whereby tracking errors caused by a dead band are minimized.

It is to be understood that an embodiment of the present invention is not limited in any way by the embodiments thereof described above.

It should be understood that the embodiments described above are merely examples of how the present invention may be implemented, and various design modifications are possible where appropriate according to specifications.

For example, in a first modified example, the second magnetic part of the burst pattern region or the first magnetic part of the data recording region may have a rectangular shape. In a second modified example, the conditions that the track pitch Tp is roughly equal to the read core width Rcw and Tp<Sp/2<2Tp are met. Furthermore, in the second modified example, the pitch Sp is set with respect to the track pitch Tp. In addition, in the second modified example, the number of lines forming the base unit is appropriately set with respect to the number of lines forming one track. In the second modified example, the second magnetic part of the burst pattern region is placed in the same position as the first magnetic part of the data recording region in the radial direction of the disk. The second modified example makes it easier to produce patterns of the data recording region and the burst pattern region at the time of production.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A magnetic disk having a magnetic part in a nonmagnetic region, comprising:
   a data recording region having first magnetic parts; the first magnetic parts being arranged in a circumferential direction in the nonmagnetic region and form tracks, and the tracks being arranged in a radial direction at a track pitch Tp; and
   a burst pattern region having burst patterns making a magnetic head follow the first magnetic parts, the burst patterns having second magnetic parts, the second magnetic parts forming base units arranged at a pitch Sp in a radial direction of the disk, the pitch Sp being more than twice as large as the track pitch Tp and less than four times as large as the track pitch Tp, the base units comprising a plurality of base units arranged in a circumferential direction of the disk, and the base units adjacent to each other in the circumferential direction being displaced from each other variously by both ½ and ¼ of the pitch Sp in the radial direction of the disk.

2. The magnetic disk according to claim 1, wherein
   each base unit is formed as a unit made up of a single line or a plurality of lines arranged in the radial direction of the disk, the single line or the plurality of lines each being a line in which the second magnetic parts are arranged in the circumferential direction of the disk.

3. The magnetic disk according to claim 2, wherein
   at least one base unit forming at least any one of the plurality of burst patterns is formed in a same position as any one of the tracks of the data recording region in the radial direction of the disk.

4. The magnetic disk according to claim 1, wherein
   each track of the data recording region is made up of a line in which the first magnetic parts are arranged in the circumferential direction of the disk at a given pitch.

5. The magnetic disk according to claim 1, wherein
   the second magnetic parts have a same shape as the first magnetic parts, and have a circular shape, an elliptical shape, or a rectangular shape.

6. A magnetic disk device performing recording on a magnetic disk having a magnetic part in a nonmagnetic region, comprising:
   a data recording region having first magnetic parts; the first magnetic parts being arranged in a circumferential direction in the nonmagnetic region and form tracks, the tracks being arranged in a radial direction at a track pitch Tp; and
   a burst pattern region having burst patterns making a magnetic head follow the first magnetic parts, the burst patterns having second magnetic parts, the second magnetic parts forming base units arranged at a pitch Sp in a radial direction of the disk, the pitch Sp being more than twice as large as the track pitch Tp and less than four times as large as the track pitch Tp, the base units comprising a plurality of base units arranged in a circumferential direction of the disk, and the base units adjacent to each other in the circumferential direction being displaced from each other variously by both ½ and ¼ of the pitch Sp in the radial direction of the disk.

* * * * *